No. 11,974. Reissued Mar. 4, 1902.

C. B. REARICK.

STEAM BOILER.

(Application filed June 3, 1901.)

3 Sheets—Sheet 1.

Witnesses
G. K. Fullagar
Albert. Voss.

Inventor
Chas. B. Rearick

THE NORRIS PETERS CO., PHOTO-LITHO., WASHINGTON, D. C.

No. 11,974. Reissued Mar. 4, 1902.

C. B. REARICK.

STEAM BOILER.

(Application filed June 3, 1901.)

3 Sheets—Sheet 2.

Witnesses
G. K. Fullager
Albert. Voss.

Inventor
Chas. B. Rearick

THE NORRIS PETERS CO., PHOTO-LITHO., WASHINGTON, D. C.

No. 11,974. Reissued Mar. 4, 1902.

C. B. REARICK.

STEAM BOILER.

(Application filed June 3, 1901.)

3 Sheets—Sheet 3.

WITNESSES:

F. C. Rearick

G. M. Fullager

INVENTOR

Chas. B. Rearick

THE NORRIS PETERS CO., PHOTO-LITHO., WASHINGTON, D. C.

UNITED STATES PATENT OFFICE.

CHARLES B. REARICK, OF NEW YORK, N. Y.

STEAM-BOILER.

SPECIFICATION forming part of Reissued Letters Patent No. 11,974, dated March 4, 1902.

Original No. 639,907, dated December 26, 1899. Application for reissue filed June 3, 1901. Serial No. 63,036.

*To all whom it may concern:*

Be it known that I, CHARLES B. REARICK, a citizen of the United States, and a resident of New York, county of New York, and State of New York, have invented certain new and useful Improvements in Steam-Boilers, of which the following is a specification.

Some of the objects of the invention are, first, compactness, to cover little ground-space; second, to secure rapid circulation and to free the steam from the heating-surface as rapidly as possible and with the least obstruction possible on its way to the steam and water drum after leaving the effective heating-surface; third, to secure dry steam; fourth, a boiler in which the solid impurities in the water would not interfere with the economic working or natural life of the boiler.

The principles of my invention are shown in the accompanying drawings, of which—

Figure 1:
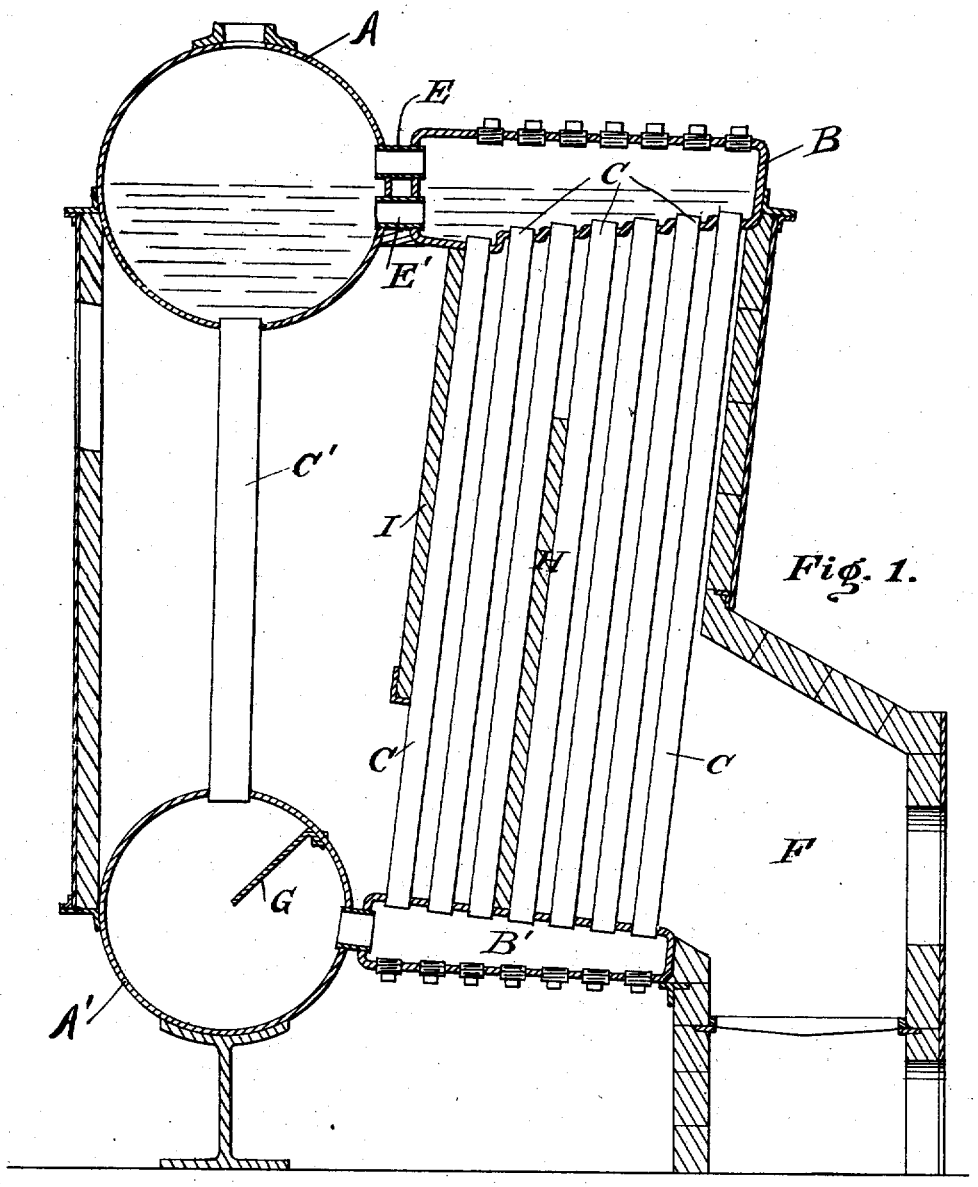
Figure 2:
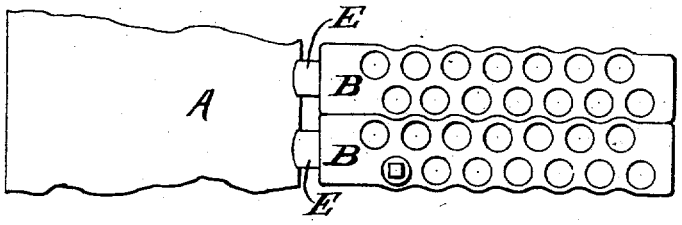
Figure 3:
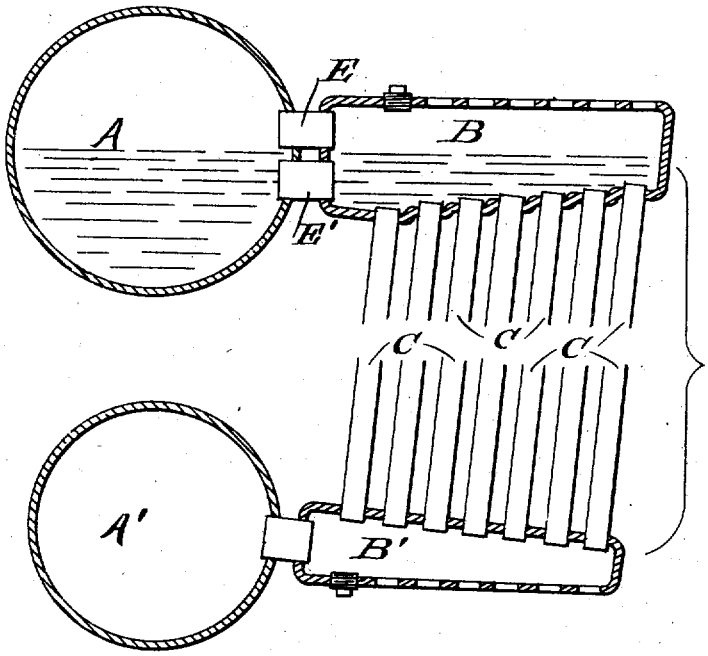
Figure 4:
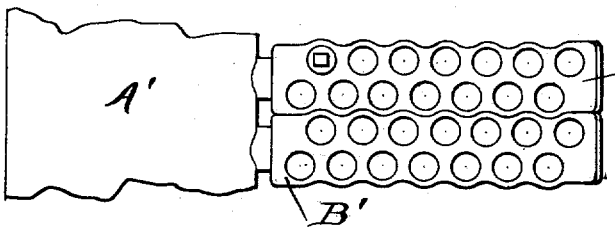
Figure 5:
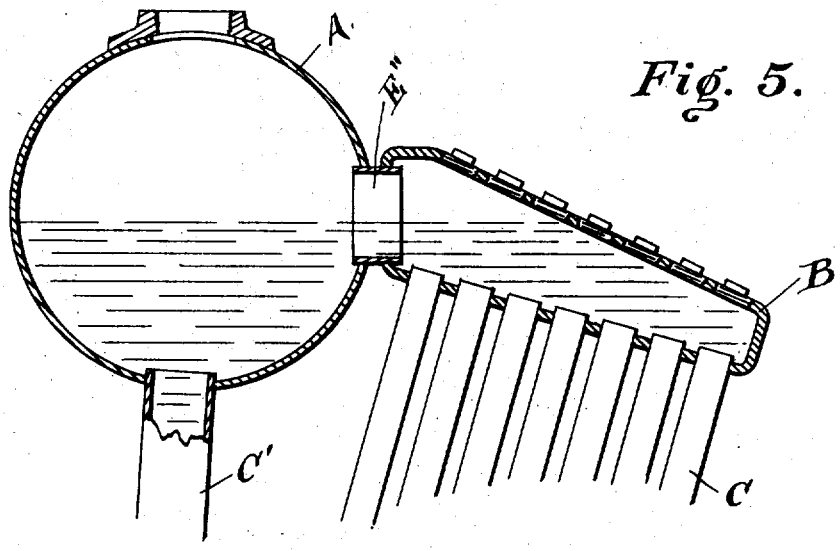

Figure 1 represents a vertical cross-section through furnace and boiler; Fig. 2, a top view of upper headers; Fig. 3, vertical cross-section of headers and connections, showing water-line; Fig. 4, a bottom view of lower header; Fig. 5, section of an inclined upper header, steam and water drum, and single-pipe form of connection, and Fig. 6, plan view of Fig. 5.

Like letters of reference represent same parts in the different figures.

The boiler, as shown, consists of one or more upper headers or manifolds B, extending in a horizontal direction, or they may be placed in a direction inclined to the horizontal; a cylindrical steam and water drum A, having its axis horizontal and parallel to the front of the boiler and connected to the header or headers B, so that the water-line passes through said steam and water drum and connections and into said headers; a cylindrical water and mud drum A′, having its axis parallel with that of the water and steam drum, but below it and connected to it by several vertical or vertically-inclined tubes or pipes C′. The water and mud drum is connected to lower header or a series of lower headers or manifolds B′, this lower header or headers being connected to upper header or headers B by means of banks of vertical or vertically-inclined tubes C. In the water and mud drum A′ is placed a deflecting-plate G, which extends from the upper portion of shell downward, same being placed between the inlet-openings from large tubes connecting steam and water drum with water and mud drum and outlet-openings into lower header or headers.

The operation of the boiler is as follows: The boiler being filled with water and the fire started in furnace F, the heat passing in among tubes C causes the circulating water to rise to header B, from there to steam and water drum A, down tubes C′ to water-drum A′, into header B′, and so on up again through tubes C. In this manner I get a rapid and free circulation. As steam is generated in the heating-tubes the water and steam in same pass to the header or headers B, where the steam separates from the water, and each passes on to the water and steam drum independently of the other. By this construction if sufficient heat is applied to increase the circulation beyond the capacity of tubes C′ the water will flow down from header B to header B′ through some of the tubes C between walls H and I, which will prevent a rapid fluctuation of the water-line and insure the free passage of the steam through the passages between the steam and water drum and headers and also give drier steam at the steam-supply pipe.

Figure 6:
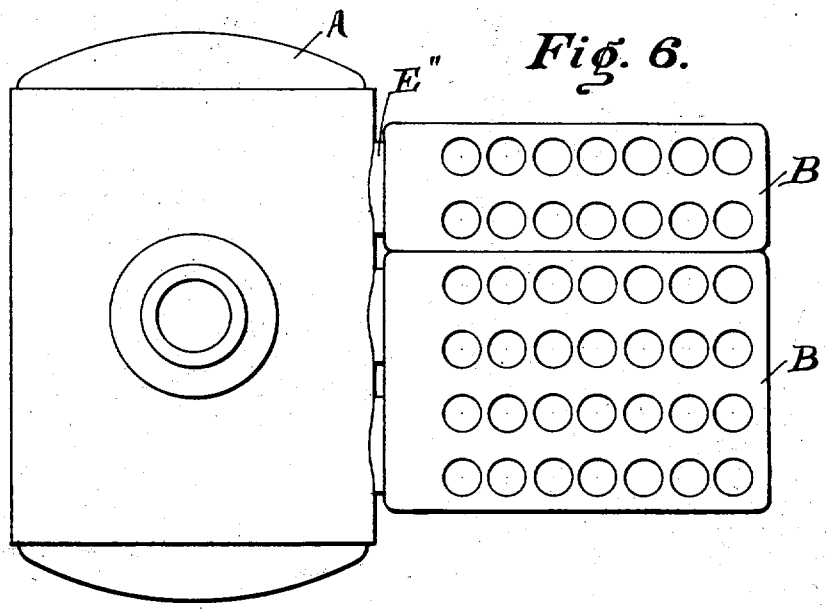

I show the header B with an irregular surface where the tubes enter, owing to placing the tubes on an angle and wishing to maintain header B in a horizontal line, while header B′ is slightly pitched downward at the far end from water-drum A′. While I prefer this construction, I may have both headers in a horizontal position and tubes C in vertical lines. In that case there would not be any irregular surface where the tubes enter header B, as would also be the case when upper header is inclined to a position parallel to the lower header. In Fig. 5 I show an upper header inclined to such a position and also show the normal water-line and the steam-space in same, which permits of the steam separating from the water while in the header. Fig. 6 shows plan view of this arrangement. I may construct this boiler of one upper header and one lower header, or there may be a series of upper and lower headers.

I connect header or headers B to water and steam drum A by short tubes E and E′, one above the other. I might use only one, as shown in Fig. 5 at E″; but I prefer to use two, as in case I should run my water-line below or part way up in tube E this would give me a free exit of steam from header B into steam and water drum A.

By feeding water in at drum A the new water added will be heated to such a temperature by the time it reaches the drum A′ that the solid matter will be precipitated and collected in said drum A′ and by means of blow-off at bottom of this drum can be removed. Deflecting-plate G in lower water-drum A′ I place there for the object of preventing the water taking too short a course from tubes C′ to header or headers B′, which would prevent to some extent the opportunity of sediment settling in the lower part of water-drum A′.

Having thus described my invention, what I claim as new, and desire to secure by Letters Patent, is—

1. Combination in a water-tube boiler of a furnace, water and steam drum A, connected to a substantially horizontal header or headers B so that water-line passes through said header or headers, connections and water and steam drum A; downflow-pipes C′ connecting steam and water drum A to water and mud drum A′, said drum A′ being connected to header or headers B′, header or headers B′ connected by upflow-pipes C to header or headers B, all substantially as shown and described and for the purpose set forth.

2. Combination in a water-tube boiler of a furnace, water and steam drum A, substantially horizontal header or headers B connected to water and steam drum A by two or more pipes E and E′ one above another as described and for the purpose set forth, downflow-pipes C′ connecting drum A to lower header or headers B′, header or headers B′ connected to header or headers B by water-tubes C.

3. Combination in a water-tube boiler of a furnace, water and steam drum A, header or headers B connected to water and steam drum A by one or more tubes E and one or more tubes E′, as described and for the purpose set forth, header or headers B connected to header or headers B′ by water-tubes C, header or headers B′ being also connected to water and mud drum A′, water-tubes C′ connecting water and mud drum A′ to water and steam drum A all substantially as shown and described.

4. Combination in a water-tube boiler of a furnace F, water and steam drum A, substantially horizontal header or headers B, with connections to drum A as shown and described; said header or headers B connected to lower header or headers B′ by water-tubes C, said lower header or headers B′ connected to water and mud drum A′, separating-plate G in drum A′, water-tubes C′ connecting water and mud drum A′ to water and steam drum A as shown and described and for the purpose set forth.

5. In a water-tube boiler, the combination of a steam and water drum, with an independent header connected to such drum by one or more sets of passages arranged one above the other, the normal water-line in said drum passing between the upper and lower passages of each set of connecting-passages and entering and extending into the header.

6. In a water-tube boiler, the combination of a steam and water drum, with a series of independent headers, each connected to such drum by a set of passages arranged one above the other, the normal water-line in such drum passing between the upper and lower passages of each connecting set, and entering and extending into the headers.

7. In a water-tube boiler, the combination of a steam and water drum, downflow-pipes from such drum, a header, the tube-sheet of which is normally submerged, with one or more sets of passages connecting such header and drum, the passages of each set arranged one above the other and the normal water-line in such drum passing between the upper and lower of such passages of each set and entering and extending into the header.

8. In a water-tube steam-boiler, the combination of a steam and water drum, downflow-pipes from such drum, a series of headers, the tube-sheets of which are normally submerged, with a set of passages connecting each header with the said drum, such passages arranged one above the other and the normal water-line in the said drum passing between the upper and lower of such passages and entering and extending into the said headers.

9. In a water-tube boiler, the combination of a steam and water drum, an independent header having one face adjacent to said drum and its tube-sheet normally submerged and substantially parallel to the top face of same, with a series of passages connecting such adjacent face of header to said drum, each of such passages reaching substantially the whole height of said adjacent face and the normal water-line in said drum passing through such connecting-passages and entering and extending into the header.

10. In a water-tube boiler, the combination of a steam and water drum, a series of independent headers, each having one face adjacent to said drum and its tube-sheet normally submerged and substantially parallel to the top face of same, with a passage connecting the adjacent face of each header to the said drum, such passages reaching substantially the whole height of said adjacent faces of headers, and the normal water-line in said drum passing through such connecting-passages and entering and extending into the header.

Signed at New York, in the county of New York and State of New York, this 20th day of May, A. D. 1901.

CHAS. B. REARICK.

Witnesses:

T. C. REARICK,

G. K. FULLAGAR.